United States Patent [19]

Miyake et al.

[11] Patent Number: 5,121,218

[45] Date of Patent: Jun. 9, 1992

[54] RECORDING/PLAYBACK APPARATUS AND METHOD OF COMMUNICATION IN SAME

[75] Inventors: Izumi Miyake; Kiyotaka Kaneko; Yoshio Nakane; Yutaka Maeda; Hiroshi Shimaya, all of Tokyo, Japan

[73] Assignee: Fuji Photo Film Co., Ltd., Kanagawa, Japan

[21] Appl. No.: 315,441

[22] Filed: Feb. 24, 1989

[30] Foreign Application Priority Data

Feb. 24, 1988 [JP] Japan ................................. 63-39465
Feb. 24, 1988 [JP] Japan ................................. 63-39468
Apr. 7, 1988 [JP] Japan ................................. 63-84080

[51] Int. Cl.⁵ ............................................. H04N 5/76
[52] U.S. Cl. ................................... 358/337; 358/342; 358/906; 360/36.1; 369/50
[58] Field of Search ................. 358/310, 320-323, 358/327, 335, 337-339, 342, 906, 909; 360/26, 33.1, 36.1-36.2, 73.03, 10.1; 369/44.25, 50, 54, 58; 364/136, 200 MS File

[56] References Cited

U.S. PATENT DOCUMENTS

| 4,545,016 | 10/1985 | Berger | 364/200 |
| 4,549,262 | 10/1985 | Chung et al. | 364/200 |
| 4,812,922 | 3/1989 | Minoura et al. | 360/10.1 |
| 4,918,538 | 4/1990 | Saito et al. | 358/335 |

Primary Examiner—Roy N. Envall, Jr.
Assistant Examiner—W. R. Young
Attorney, Agent, or Firm—Birch, Stewart, Kolasch & Birch

[57] ABSTRACT

A recording/playback apparatus is provided with a plurality of controllers (inclusive of CPU's) which, by communicating with one another, share control of each of the components of the recording/playback apparatus or of the entire apparatus. Communication among the controllers is performed in the second half of one period of a signal related to the rotational reference phase of a rotating recording medium. This makes it possible for control requiring high precision to be performed in the first half of the aforementional period without being affected by high-priority interrupts which accompany communication control. Further, in order that the aforementioned communication may be carried out in the second half of the above mentioned period, message editing is performed in the first half of the same period. This enables prompt communication processing during the short time in the second half of the period without an unnecessary waste of time.

9 Claims, 11 Drawing Sheets

RECORDING/PLAYBACK APPARATUS AND METHOD OF COMMUNICATION IN SAME

BACKGROUND OF THE INVENTION

This invention relates to a recording/playback apparatus which performs at least recording of a prescribed signal on a rotating magnetic, optical or other recording medium in synchronization with its rotational reference phase, or playback of a signal from the rotating recording medium in synchronization with its rotational reference phase. More particularly, the invention relates to a system in which control of such a recording/playback apparatus is shared by a plurality of controllers (inclusive of CPU's). The invention relates also to a method of communication among the plurality of controllers in the recording/playback apparatus.

Typical examples of a recording/playback apparatus of the kind mentioned above include a still video camera which forms a still image of a subject by means of a solid-state electronic image pick-up device, frequency-modulates the still video output of the device and magnetically records the modulated signal on a rotating video floppy, a playback apparatus which plays back the still video signal from a video floppy, and an apparatus which possess both of these recording and playback functions.

In such a still video signal recording/playback apparatus, one field of a still video signal is recorded and/or played back by one revolution of the video floppy. A reference angle position for recording/playback of the still video signal relative to the video floppy is predetermined and is detected by a phase detector. A reference signal (a vertical synchronizing signal or the like) is formed for the purpose of recording/playback synchronized to phase pulses outputted by the phase detector. The principal operation of the recording/playback apparatus is performed with this reference signal serving as the overall reference.

A disk motor for rotatively driving the video floppy is controlled by a servo-control circuit so as to rotate precisely at a fixed rotational speed (rpm). Any fluctuation in the rotational speed will result in recording/playback of the still video signal being performed incorrectly. This makes it necessary to check, at all times, whether the rotational speed of the disk motor is being held at the predetermined fixed value. Such an operation is referred to as servo-lock decision processing.

Processing (synchronized phase relationship decision processing) for synchronizing the phase pulses representing the rotational phase of the video floppy and the reference signal of the apparatus so that a predetermined phase relationship will be maintained between them, or for performing a check to see whether the predetermined phase relationship is being maintained, as well as the abovementioned servo-lock decision processing, includes processing for measuring very small periods of time. For this reason, very high precision is required.

Meanwhile, consider an arrangement in which control of a recording/playback apparatus is shared by a plurality of controllers (inclusive of CPU's). In such a case, it will be necessary for the controllers to communicate with one another. In such an arrangement, a communication request is generated separately by each controller, and it is required that such a request be responded to promptly. In general, therefore, control of communication among the plurality of controllers is given a high order of priority.

However, if an interrupt for communication purposes arrives and a controller proceeds to the interrupt processing routine during the course of synchronized phase relationship decision processing or servo-lock decision processing, there is the danger that the high precision of this decision processing will not be able to be maintained. Accordingly, it is preferred that the controllers be forbidden from executing communication processing during the time that the abovementioned decision processing is being carried out.

The abovementioned recording/playback apparatus comprises a multiple-CPU system constituted by a main CPU (master CPU) and subordinate CPU's (slave CPU's) connected thereto. With such a multiple-CPU arrangement, measures must be taken to deal with an instantaneous-shutdown phenomenon.

The term "instantaneous shutdown" refers to an instantaneous drop in power supply voltage and has a variety of causes. For example, in a case where a multiple-CPU system is powered by a battery, the system will come to an instantaneous shutdown if contact with the battery terminals is temporarily lost due to vibration or the like. Also, there are situations in which the supply voltage drops when an excessively large current flows through the electrical components (e.g., motor and solenoids) controlled by the multiple-CPU system.

To cope with this instantaneous-shutdown phenomenon, a circuit for detecting the phenomenon is provided and the CPU's assume a standby state when the phenomenon is detected. This prevents CPU malfunction and runaway ascribable to instantaneous shutdown.

Since the instantaneous-shutdown phenomenon is a drop in power supply voltage, it is preferred that the multiple-CPU system be arranged so as to resume operation as soon as the power supply voltage is restored. Moreover, it would be desirable for this resumption of operation to take place automatically without requiring, to the maximum degree possible, an operator input from the outside.

SUMMARY OF THE INVENTION

An object of the present invention is to achieve harmony between high-precision processing and communication processing in a recording/playback apparatus which includes a plurality of controllers that communicate with one another and share control of the apparatus, in which at least one of the controllers is required to perform the high-precision processing.

Another object of the present invention is to provide a method of harmonizing the high-precision processing and communication processing in the above-described recording/playback apparatus, and of enabling prompt communication in the apparatus.

Still another object of the present invention is to provide a multiple-CPU system in which CPU runaway and the like can be prevented when instantaneous shutdown occurs, and in which operation can be resumed promptly upon restoration of the system.

According to the present invention, the foregoing objects are attained by providing a recording/playback apparatus characterized in that communication processing for communication among a plurality of controllers is performed in the second half of one period of a reference signal related to the rotational reference phase of a recording medium.

By virtue of this arrangement, control which requires a high precision can be performed in the first half of the period of the reference signal without being adversely affected by interrupts or the like that accompany communication control. Communication processing and processing requiring high precision are thus harmonized. Moreover, since the reference signal is generated at a comparatively short period, both the high-precision processing and communication processing can be executed every period so that prolonged blank intervals do not arise in these processing operations.

In another aspect of the invention, there is provided a method of communicating in the abovementioned recording/playback apparatus characterized in that communication processing for communication among a plurality of controllers is performed in the second half of one period of a reference signal related to the rotational reference phase of a recording medium, and messages to be transmitted in the second half of the period are formed, arrayed in a transmission sequence and stored in a buffer in the first half of the period.

Thus, according to the invention, communication is performed in the second half of the period of the reference signal. In the first half of the period, therefore, control requiring high precision can be performed without being adversely affected by interrupts or the like that accompany communication control. Communication processing and processing requiring high precision are thus harmonized.

Further, according to the invention, the arrangement is such that messages to be transmitted by communication processing in the second half of one period of the reference signal are formed and arrayed in the order of transmission in the first half of the first half of the period. Consequently, it is unnecessary to perform message editing during communication in the second half of the period, as a result of which communication can be performed promptly. Since the reference signal is generated at a comparatively short period, the duration of one period of the signal is short but the above-described method makes highly efficient communication possible. Particularly effective results are obtained when it is arranged to have message editing processing performed in the first half of the abovementioned period by a controller other than that which is performing the control requiring high precision in the same half of the period.

The multiple-CPU system according to the present invention is composed of a main CPU and at least one subordinate CPU connected thereto. Each of these CPU's is provided with a detector circuit for detecting that a main power supply voltage has dropped below a predetermined threshold level. When the detector circuit outputs a signal indicating detection of the drop in main power supply voltage, the corresponding CPU is placed in a standby state.

The threshold level of the detector circuit of the main CPU is set to a voltage lower than the threshold level of the detector circuit of each of the subordinate CPU's. In other words, the subordinate CPU detector circuit detects the voltage drop (instantaneous shutdown) of the main power supply with high sensitivity, whereupon the subordinate CPU is placed in the standby state.

The main CPU is equipped with means for starting the subordinate CPU placed in the standby state. Accordingly, when the subordinate CPU enters the standby state, automatic recovery processing is carried out in which this subordinate CPU is started by the main CPU and resumes operation.

Since the threshold level of the main CPU detector circuit is set to be lower than that of the subordinate CPU and therefore is comparatively insensitive, the main CPU will not assume the standby state before the subordinate CPU's. This means that when the subordinate CPU assumes the standby state, it can always be started by the main CPU.

The main CPU is backed up by an auxiliary power supply at all times. Therefore, even if the main CPU assumes the standby state, it is capable of being restarted by an externally applied switch input signal, such as a power supply switch input signal.

Thus, according to the invention, CPU runaway or the like can be prevented even if the system stops instantaneously, and automatic recovery is performed quickly and automatically.

Though an embodiment will be described hereinafter with regard to an embodiment in which the invention is applied to a still video camera, it goes without saying that the invention is applicable also to a still video playback apparatus, an apparatus having both still video signal magnetic recording and playback functions, magnetic recording/playback apparatus for other signals, recording/playback apparatus related to optical or magneto-optical recording media, etc.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT (1) System Construction

Figure 1:
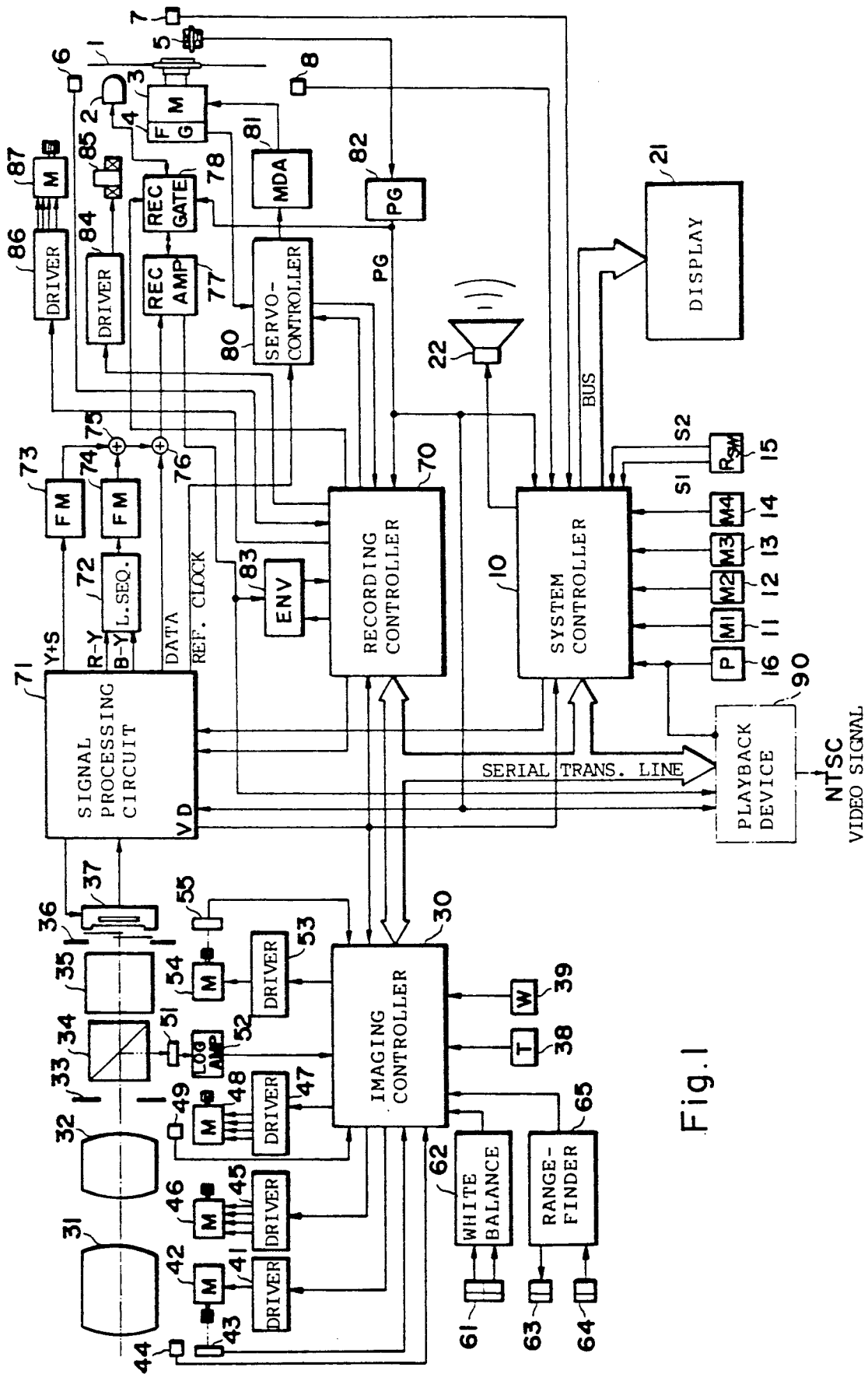
FIG. 1 is a block diagram illustrating the details of a still video camera system.

FIG. 1 illustrates the construction of a still video camera system.

This still video camera is controlled by three controllers, namely a system controller 10, an imaging controller 30 and a recording controller 70. Each of the controllers 10, 30, 70 comprises a CPU (e.g., a microprocessor), memories (a RAM, ROM, etc.) storing the program executed by the CPU as well as the necessary data, and the required interface circuit. The CPU of the system controller 10 is a main CPU for controlling the overall operation of the still video camera. The CPU's of the imaging controller 30 and recording controller 70 are subordinate CPU's, which operate in accordance with commands from the main CPU. The imaging controller 30 performs control related to such photographic functions as focusing, f-stop, shutter speed and zoom. The recording controller 70 performs control related to drive of a disk motor 3, loading/unloading of a magnetic head 2, feed of the magnetic head 2 and the recording of still video signals on a video floppy (magnetic disk) 1. The controllers 10, 30, 70 are interconnected by a serial transmission line (which includes five lines, as will be described below) and communicate at a predetermined timing, also described below.

A playback device (playback adapter) 90 can also be connected. The playback device 90 demodulates a still video signal read out of the video floppy 1, converts the signal into, say, a color still video signal in the NTSC format, and outputs the converted signal. The playback device 90 also includes a CPU and memory, this CPU being positioned as a subordinate CPU with respect to the main CPU.

A still video camera is provided with a receptacle which can be freely opened and closed. The video floppy 1 is inserted into the opened bucket. When the receptacle is subsequently closed, the video floppy 1 is fed onto the spindle of the disk motor 3.

The video floppy 1 is provided with a plurality (e.g. 50) of concentric, circular tracks (track pitch is 100 $\mu_m$, by way of example). By means of imaging processing, one field or frame of a frequency-modulated color still video signal (inclusive of a luminance signal and color difference signal, etc.) is magnetically recorded on one or two tracks. The 50 concentric, circular tracks provided on the magnetic recording surface of the floppy disk 1 are numbered consecutively from No. 1 to No. 50 from the outer to the inner side thereof. A home position HP (an origin position or standby position) is located on the outer side of Track No. 1, and an end position EP is situated on the inner side of Track No. 50.

Applied as inputs to the system controller 10 are switch input signals from a power supply switch 16, various mode switches 11-14 and a shutter release button 15, a detection signal from a receptacle switch 7 which detects whether the receptacle for accommodating the video floppy 1 is open or closed (and, if necessary, whether or not the video floppy is present within the receptacle), and a detection signal from a condensation sensor 8 which measures the humidity near the location at which the video floppy 1 is loaded. Modes which can be set include a frame/field mode indicative of frame recording or field recording, a skip mode for providing the video floppy with blank tracks on which a recording is not made, and an edit mode for performing recording on the blank tracks. The set modes, the track numbers which are to be recorded on and other information are displayed on a liquid crystal display device 21. The display device 21 is connected to the system controller by a bus. When condensation or some other abnormality occurs, a buzzer 22 is sounded. It is also permissible for the display device 21 to display the fact that condensation has been detected.

The shutter release button 15 is of the two-stage stroke type. A switch S1 is closed by pressing the button 15 over the first stage of its stroke, and a switch S2 is closed by pressing the button 15 over the second stage of its stroke. The disk motor 3 is driven into operation when the switch S1 is closed, and both imaging and recording are performed when the switch S2 is closed.

The imaging optical system is composed of a zoom lens system 31, an imaging lens system 32 for forming the image of a subject, a diaphragm 33, a beam splitter 34 for deflecting part of an incident light beam so that this part of the beam will impinge upon a photometric element 51, an infrared shielding filter 35, and a shutter 36. An illumination detection signal from the photometric element 51 is inputted to the imaging controller 30 via a logarithmic amplifier 52. The imaging controller 30 is operative to perform processing for calculating an f-stop value and shutter speed based on the intensity of illumination of the incident light detected by the photometric element, control the diaphragm 33 based on the f-stop value decided, and control the opening and closing of the shutter 36 based on the shutter speed decided. The opening and closing of the diaphragm 33 is carried out by a diaphragm motor 48 driven by a driver 47. Also provided is a switch 49 for detecting opening and closing limit positions of the diaphragm 33. Latch release of the front and rear curtains of the shutter 36 and wind-up thereof are executed by a shutter drive unit which includes a shutter motor 54 driven by a driver 53. The angle of rotation of the motor 54 is detected by a rotary encoder 55 and fed back to the controller 30.

A color detection signal from a color sensor 61 is fed into the controller 30 after being subjected to predetermined processing by a white-balance processing circuit 62. The white-balance data is used in order to control the amplification gain of R, G and B signals in a variable-gain amplifier circuit, described below, of a signal processing circuit 71.

In order to measure the range to the subject, an infrared light-emitting diode 63 and a light-receiving element 64 for receiving the reflected light are provided. Data indicative of range to the subject is obtained by a rangefinding circuit 65 based on the output signal from the light-receiving element 64. An auto-focusing motor 46 is driven via a driver 45 under the control of the controller 30 using the range data, whereby focusing control is performed.

In response to signals from a telephoto switch 38 and wide-angle switch 39 that are for inputting the degree of zoom, a motor 42 is driven by the controller 30 via a driver 41 to set a prescribed zoom magnification. The angle of rotation of motor 42 is detected by a rotary encoder 43 and fed back to the controller 30.

Disposed in the focal plane of the imaging optical system is a solid-state electronic image pick-up device 37, for the three primary colors, comprising a two-dimensional image pick-up cell array such as CCD's. Image data stored in the image pick-up device 37 when the shutter 36 opens is read out as a serial still video signal (R,G,B) in synchronization with vertical and horizontal synchronizing signals provided by a signal processing circuit 71. This serial signal is fed into the signal processing circuit 71.

The signal processing circuit 71 includes an oscillator circuit from the output signal of which a vertical reference signal VD and a reference clock signal are formed and outputted. The vertical reference signal VD is applied to the system controller 10, the imaging controller 30 and the recording controller 70 to serve as a reference for the operation timing of each of these devices. The reference clock signal is applied to a servo-control circuit 80. As will be described below, a phase pulse PG which represents the reference phase of rotation of the video floppy 1 is applied to the signal processing circuit 71, system controller 10, recording controller 70 and playback device 90. In response to a reset signal from the recording controller 70, the signal processing circuit 71 adjusts the vertical reference signal VD in such a manner that it will maintain a constant phase relation with regard to the phase pulse PG. In addition, the signal processing circuit 71 generates the vertical and horizontal synchronizing signals, which possess a constant phase relation with regard to the phase pulse PG.

Further, the signal processing circuit 71 is equipped with a preamplifier circuit to which the still video signal (R,G,B) is applied, a variable-gain amplifier circuit (white-balance adjusting circuit) and a process matrix circuit. A luminance signal Y (on which a synchronizing signal S is superposed) and two color difference signals R-Y, B-Y are formed within the process matrix circuit. These color difference signals R-Y, B-Y are line-sequenced every 1H (1H represents the horizontal scanning interval) by a line sequencing circuit 72. The luminance signal Y and the line-sequenced color difference signal are directed through pre-emphasis circuits (not shown) and then applied to frequency modulator circuits 73, 74, where the signals are frequency modulated at respective frequency bands which differ from each other. The resulting frequency-modulated signals are combined in a mixing circuit 75.

It is possible for additional information to be recorded on tracks of the floppy disk 1. The additional information mentioned here refers to an audio signal (which represents a voice for narration, music, etc.) and a display signal (which represents, say, character information). This additional information signal enters the signal processing circuit 71 from a microphone or other input device (not shown) to be converted into a predetermined format before being delivered to the line for the luminance signal Y. There are also cases where the additional information signal is superposed on the luminance signal Y. In a case where only the additional information signal is recorded on a predetermined track of the video floppy 1, this signal alone will be outputted.

It is possible to perform multiplexed recording of data on the video floppy 1. The multiplexed recorded data is composed of an initial bit, field/frame data, track address (No.) data, date data and data employed by the user. These items of data, which are provided by the system controller 10, are DPSK (differential phase shift keying)-modulated by the signal processing circuit 71 and are combined along with the abovementioned frequency-modulated video signal in the mixing circuit 76. The resulting signal is fed into a recording amplifier circuit 77.

The magnetic head 2 (two of which are provided at a spacing with positions them at mutually adjacent tracks so as to make frame recording possible), which is for writing the still video signal of the imaged subject on a predetermined track of the video floppy 1, is supported so as to be freely movable diametrically of the floppy disk 1, and is controlled so as to be fed in the same direction, by a feed drive controller. The latter includes a stepping motor 87 and a driver 86. The recording controller 70 provides the feed drive controller with instructions regarding the feeding direction and the amount of feed of the magnetic head 2. Also provided is a home position switch for detecting that the magnetic head 2 has arrived at the home position HP. The detection signal from the switch 6 is applied to the recording controller 70.

A head loading device is provided in order to prevent the floppy disk 1 from becoming scarred due to prolonged contact between the magnetic head 2 and the magnetic disk 1 when the latter is at rest. Under the control of the recording controller 70, the head loading device, which includes a head loading solenoid 85 and its driver 84, displaces (advances and retracts) the magnetic head 2 in such a manner that the magnetic head 2 contacts the video floppy 1 only at recording or playback (when the video floppy 1 is rotating) or only when power is being introduced, and is separated from the video floppy 1 at all other times.

In order to provide good contact between the magnetic head 2 and the rotating video floppy 1, a regulating plate (not shown) is provided on the side of the video floppy opposite the magnetic head 2. Disposed adjacent the core of the video floppy 1 is a phase detector 5 which, by detecting the leakage flux from a permanent magnet for feeding purposes, senses when the video floppy 1 has arrived at a predetermined angular position, whereupon the detector 5 outputs a phase detection signal. The output detection signal of the phase detector 5 has its waveform shaped by a phase pulse generating circuit (waveform shaping circuit) 82, which delivers the signal as the phase pulse PG. This pulse is applied to the controllers 10, 70, 90, the circuit 71 and a recording gate circuit 78, as mentioned above. One of the phase pulses PG is generated whenever the video floppy 1 makes one revolution.

The disk motor 3 is driven by its driver 81. The rotational speed (rpm) of the disk motor 3 is detected by a frequency generator 4, which outputs a detection signal whose frequency is proportional to the rotational speed of the motor 3. This signal enters the servo-control circuit 80. Based on the reference clock signal which enters from the signal processing circuit 71 and the frequency detection signal which enters from the detector 4, the servo-control circuit 80 controls the motor 3 so that it will rotate at a constant speed (e.g., 3,600 rpm). The servo-control circuit 80 also starts and stops the motor 3 in accordance with a command from the recording controller 70.

The still video signal amplified by the recording amplifier circuit 77 enters the recording gate circuit 78. When a record command is issued by the recording controller 70, the recording gate circuit 78 is opened at the timing of the phase pulse PG applied thereto and remains open until the next phase pulse PG enters. As a result, the video signal and the like are applied to the magnetic head 2 to record a still video signal, etc., on a predetermined track of the video floppy 1. This recording is performed for only one revolution of the video floppy 1. This is for the case where field recording is carried out. In the case of frame recording, the gate circuit 78 is opened for two revolutions of the video floppy 1. A video signal of a first field is recorded on a certain track by one head 2 in the first revolution of the video floppy 1, and a video signal of a second field is recorded on the neighboring track by the other head 2 in the second revolution of the video floppy 1.

It is also possible for the magnetic head 2 to play back a video signal or the like from the video floppy 1. A frequency-modulated video signal or the like read from the magnetic head 2 is similarly amplified by the amplifier circuit 77 via the gate circuit 78 and then applied to an envelope detector circuit 83 and the playback device 90. This playback signal is employed in track search processing in the recording mode and not just in the playback mode.

The envelope detector circuit 83 detects the envelope of the read signal from the magnetic head 2, namely the envelope of the frequency-modulated video signal recorded on a track of the video floppy 1, and outputs a voltage signal conforming to the detected envelope. The circuit includes an A/D (analog/digital) converter, which converts the voltage signal representing the envelope into a digital quantity, namely an eight-bit digital signal representing a quantization level of, e.g., 256. This digital signal is fed into the recording controller 70.

The envelope detection signal is used in order that the recording controller 70 may determine whether a video track on the video floppy 1 is blank or already recorded on (this is referred to as track search processing). If the level of the detection signal does not attain a predetermined threshold when the magnetic head 2 is fed across a track, that track is blank. If the threshold level is attained, on the other hand, this means that the track has already been recorded on.

If necessary, the envelope detection signal may be used in recording check processing as well. Recording check processing refers to a check for determining whether a recording has indeed been made after an imaged video signal is recorded on a predetermined track by the magnetic head 2 in the manner described above. A decision is rendered to the effect that a recording has been made when the envelope detection signal is above a predetermined threshold level (2) Communication System FIG. 2 snows a specific example of a serial transmission line connecting the system controller 10, imaging controller 30 and recording controller 70 (and playback device 90). The serial transmission line is composed of five lines on respective ones of which are transmitted a system clock signal SCK, an output signal $S_o$, an input signal $S_i$, a busy (ready) signal $\overline{BUSY}$ (READY) and a request signal (REQUEST). The lines leading to the controllers 10, 30, 70 and the strobe device 91 (and playback device 90) are interconnected by wired OR's. For example, the line for the system clock signal SCK of the system controller 10 is connected to the system clock signal lines of the controllers 30, 70 and strobe device 91 (and playback device 90) by wired OR's. The other lines are similarly connected.

The system clock signal SCK is outputted by the system controller 10 and is used in order to achieve synchronization among the communicated signals. The output signal $S_o$ of the system controller 10 becomes the input signal $S_i$ to the other controllers 30, 70 (and playback device 90). Conversely, the output signal $S_o$ from each of the controllers 30, 70 (and playback device 90) becomes the input signal $S_i$ of the controller 10. The busy signal $\overline{BUSY}$ and request signal REQUEST are outputted by the imaging controller 30 and recording controller 70 (and playback device 90) and applied to the system controller 10. Addresses are assigned to controllers 10, 30, 70 (and playback device 90) for designating these components in communication processing.

Figure 3:
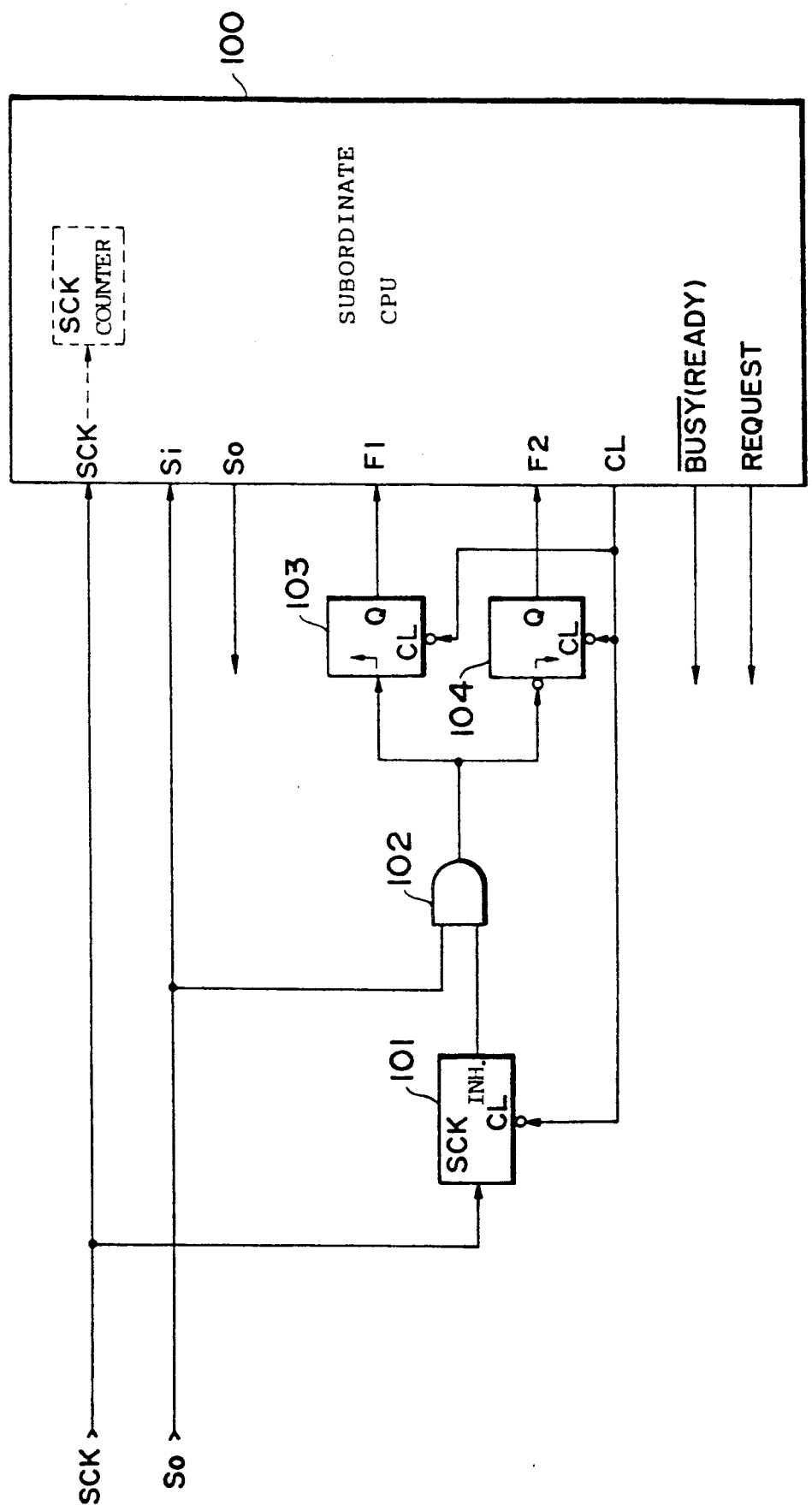
FIG. 3 is a block diagram illustrating an interface circuit for communication.

FIG. 3 illustrates an example of an interface circuit for communication provided in the controllers 10, 30, 70 (and playback device 90). Before describing this circuit, the way in which communication is performed and the form of the signal $S_o$ will be discussed with reference to FIGS. 4 and 5.

As set forth above, the phase pulse PG is generated every single revolution of the video floppy in the still video camera. One field of a still video signal is recorded on the video floppy 1 during the duration of two consecutive phase pulses PG. Accordingly, the basic operation of the still video camera is performed by achieving synchronization with the phase pulse PG serving as a reference (and therefore with the vertical reference signal VD serving as a reference, as will be appreciated later).

Figure 4:
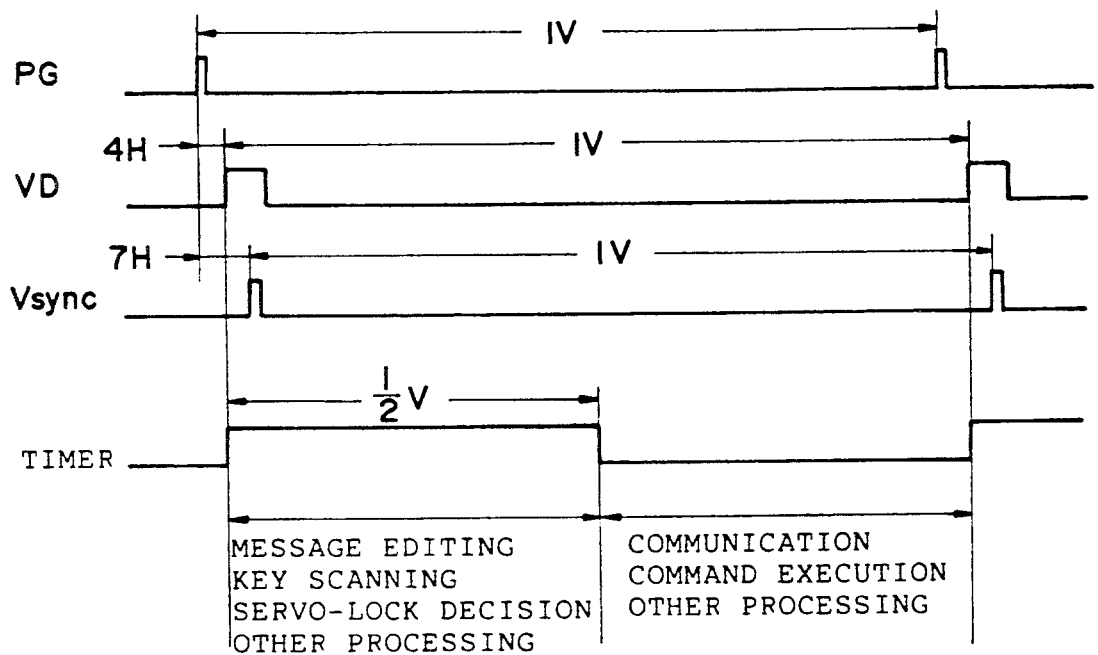
FIG. 4 is a time chart illustrating typical signals in and the basic operation of a still video camera system.

FIG. 4 shows a time chart of basic signals employed in a still video camera system. As mentioned above, the vertical reference signal VD and the vertical synchronizing signal Vsync are generated by the signal processing circuit 71. These signals VD, Vsync are controlled so as to be synchronized while maintaining a predetermined phase relation with respect to the phase pulse PG. By way of example, the vertical reference signal VD is generated 4H (1H represents the horizontal scanning interval) later than the phase pulse PG, and the vertical synchronizing signal Vsync is generated 7H later than the pulse PG. The periods of these signals PG, VD, Vsync are equal to the vertical scanning interval 1V (1/60 sec = 16.7 ms).

Communication among the controllers 10, 30, 70 (and playback device 90) is also carried out with the vertical reference signal VD as the reference.

Important processing carried out at a timing having the vertical reference signal VD as the reference includes processing (phase relation decision processing) for determining whether the vertical reference signal VD has a predetermined phase relation with respect to the phase pulse PG, and processing (servo-lock decision processing) for determining whether the rotational speed of the disk motor 3, the rotation of which is controlled by the servo-control circuit 80, has attained a predetermined rotational speed, and whether it is being maintained at this predetermined rotational speed. The phase relation decision processing and phase-lock decision processing is executed by the subordinate CPU of the recording controller 70. Since this processing is required to be performed very accurately (i.e., since it includes processing for taking measurements at short time intervals), it is required that the subordinate CPU devote itself to this processing. Accordingly, it is preferred that processing for communication with the main CPU of the system controller 10 be avoided during the length of time that the subordinate CPU is executing the abovementioned processing. The reason for this is that, in general, a high order of priority is given to an interrupt in communication processing. This means that if there is an interrupt for the purpose of communication while the subordinate CPU is executing the servo-lock decision processing or the like, so that the subordinate CPU proceeds to an interrupt processing routine, there is the danger that the high accuracy of the servo-lock decision processing will no longer be maintained.

Figure 2:
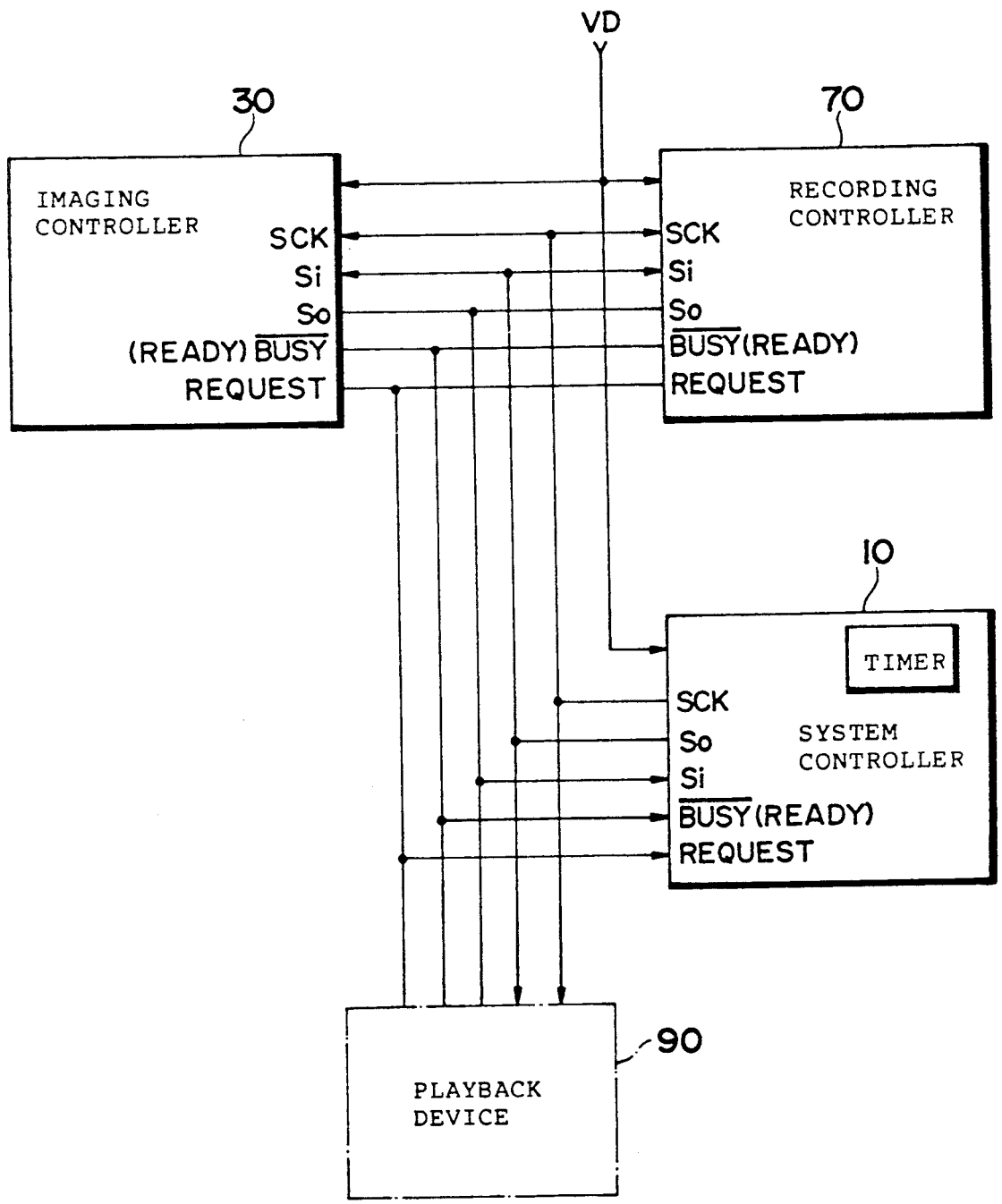
FIG. 2 is a block diagram showing, in greater detail, the manner in which control units are connected by a serial transmission line.

As shown in FIG. 4, the interval 1V which begins at the vertical reference signal VD is divided into a first half and a second half (e.g., each half has a duration of V/2), servo-lock decision processing is assigned to the first half portion, and communication processing is limited to the second half portion. Supervision over the first and second half intervals is performed by the main CPU of the system controller 10. As shown in FIG. 2, the system controller 10 is equipped with a timer for supervision over these intervals.

It should be noted that it is in no way necessary for the first half interval to be limited to V/2, for it will suffice if this is decided based on balance between the time required for processing in the first half and the time required for processing in the second half. For example, since the time required for servo-lock decision processing and phase relation decision processing is 4 ms, the duration of the first half can be made shorter in a case where only this processing is taken into consideration.

As exemplifed in FIG. 4, the following processing is performed in the interval of the first half portion of 1V in this still video camera system: servo-lock decision processing, etc., performed in the recording controller 70; key-scan processing, which is performed in the system controller 10, for scanning the power supply switch 16, the various mode switches 11-14, the shutter release button 15 and the like; message editing processing which includes command origination with regard to the controllers 30, 70 based on the key-scan processing; data acquisition processing for measurement data and the like in the controllers 30, 70; message editing processing based on this data acquisition; and other types of processing. In the interval of the second half of 1V, execution of commands attendant upon communication and other types of processing are performed in the controllers 10, 30, 70 in addition to communication processing.

Since communication processing is limited to the second half portion of 1V, it is necessary to perform this processing rapidly. By assigning message editing processing to the first half of 1V, it will be unnecessary to execute message editing processing and the like during communication processing in the second half of 1V. This will make sufficient communication possible even in a short period of time.

Figure 6:
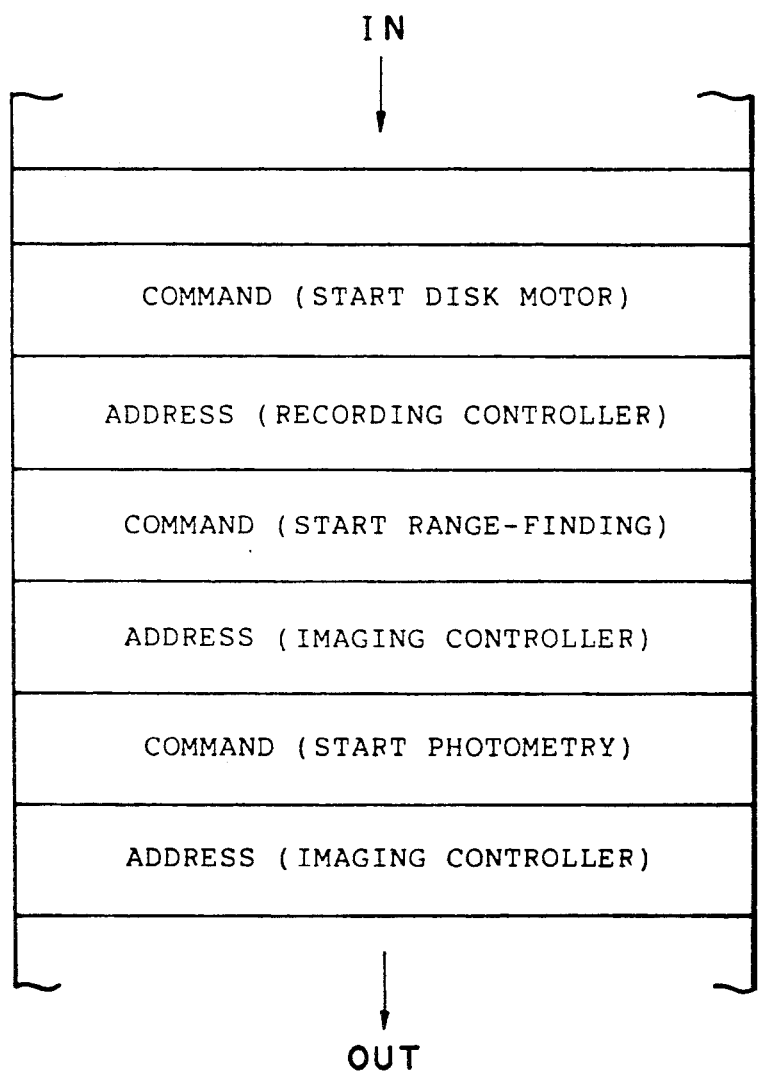
FIG. 6 is illustrative of message editing in a FIFO buffer.

As shown in FIG. 6, message editing is performed by storing the addresses, commands and data to be transmitted in a first-in first-out (FIFO) buffer in the order in which these addresses, commands and data are transmitted. FIG. 6 illustrates a message originated in the system controller 10 when the shutter release button 15 is pressed (i.e., when there is a signal input from the switch S1). The main CPU of the system controller 10 starts key-scan processing from a point in time at the leading edge of the vertical reference signal VD. When it is determined by key-scan processing that the switch S1 of the shutter release button 15 has been closed, the imaging controller 30 must be commanded to start photometric processing to control exposure as well as rangefinding processing (measurement of distance up to the subject) to control focusing, and the recording controller 70 must be commanded to start the disk motor 3. Accordingly, the main CPU responds to detection of closure of switch S1 by inputting the following to the FIFO buffer in the order in which they are transmitted, as shown in FIG. 6: an address of imaging controller 30, a photometry start command, an address of imaging controller 30, a rangefinding start command, an address of recording controller 70, and a disk motor start command (all of these comprising eight bits).

When the foregoing processing ends in the first half portion of 1V, the main CPU, in response to an interrupt from the abovementioned timer, is capable of successively transmitting, in the second half portion of 1V, the addresses and commands, which were entered in the FIFO buffer, on the line of output signal $S_o$ in accordance with a communication flow, described below, thus making it possible to perform communication processing in rapid fashion.

In response to the commands thus provided by the system controller 10, processing for executing these commands is performed in the second half portion of 1V by the controllers 30, 70, etc. For example, when the recording controller 70 receives the disk motor start command from the system controller 10, the subordinate CPU of the controller 70 provides the servo-control circuit 80 with a command for driving the motor 3.

It goes without saying that processing for acquiring data to be transmitted to the system controller 10 and for editing a message including this data in the FIFO buffer is performed also in the controllers 30, 70, etc., in the first half portion of 1V.

The output signal $S_o$ (input signal $S_i$) includes an address, a command or data. That is, the signal $S_o$ transmitted by a single cycle of signal transmission processing comprises eight bits and corresponds to one address, one command or one item of data. Accordingly, it must be so arranged that it is possible to distinguish whether the signal $S_o$ transmitted is an address, a command or data.

Figure 5:
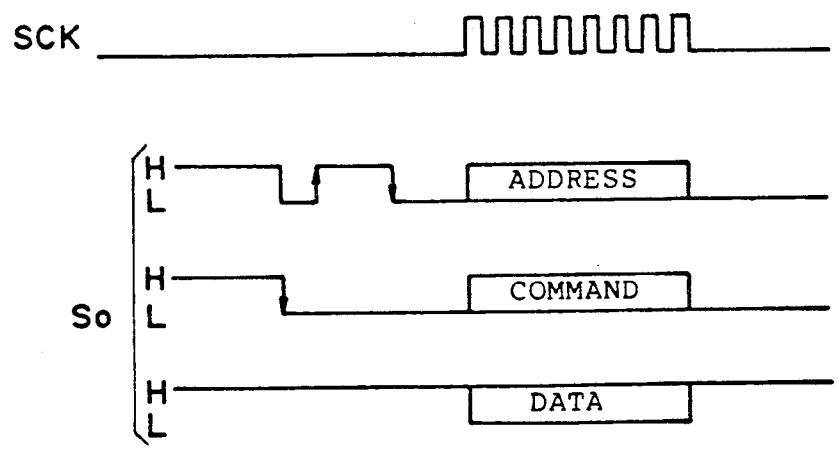
FIG. 5 is a waveform diagram illustrating a serial clock signal and output signals.

In order to distinguish among an addess, command and data, a predetermined level change is or is not applied to the signal $S_o$ before the transmission of the address, command or data. As shown in FIG. 5, if the signal $S_o$ contains an address, the signal $S_o$ decays from the H level to the L level, then rises to the H level and subsequently decays to the L level. If it contains a command, the signal $S_o$ decays from the H level to the L level. If it contains data, the signal $S_o$ is held at the H level throughout.

In order to distinguish between such a level change in the signal $S_o$ and an address, command or data, which is the essential content of the signal, the address, command and data are transmitted in sync with the clock signal SCK.

Reference will now be had to FIG. 3 to describe the interface circuit which is for determining whether the content of signal $S_o$ is an address, a command or data. Since the circuit shown in FIG. 3 is included in the controllers 30, 70 (or playback device 90), it is illustrated as subordinate CPU 100. However, this circuit is applicable also with respect to the main CPU of system controller 10. Deleted from FIG. 3 are a signal parallel/serial (P/S) converter circuit and serial/parallel (S/P) converter circuit.

The system clock signal SCK is fed into the subordinate CPU 100, where it is counted by an SCK counter (or count program), and is applied to a system clock signal (SCK) inhibit circuit 101. The latter is, say, an eight-bit counter for generating an output which attains the L level when it counts the system clock signal SDK and the H level at all other times. The output of the SCK inhibit circuit 101 enters an AND gate 102.

When the output of the SCK inhibit circuit 101 is at the H level, the output signal $S_o$ (input signal $S_i$) enters flip-flops 103, 104 through the AND gate 102. The flip-flop 103 sends its output Q to the H level upon detecting the leading edge of the signal $S_o$. The flip-flop 104 sends its output Q to the H level upon detecting the trailing edge of the signal $S_o$. The Q outputs of the flip-flops 103, 104 enter the subordinate CPU 100. These input signals shall be referred to as F1, F2, respectively.

Accordingly, if the entrant signal $S_o$ exhibits a change in level, the level change is detected by the flip-flop 103 or 104 or by both of these flip-flops in combination. Next, when the essence (address, command or data) of the signal $S_o$ enters, the system clock signal SCK also enters, so that the output of the inhibit circuit 101 assumes the L level, as a result of which the AND gate 102 closes and the states of flip-flops 103, 104 remain as they are. The entrant system clock signal SCK is counted by the SCK counter.

Figure 7:
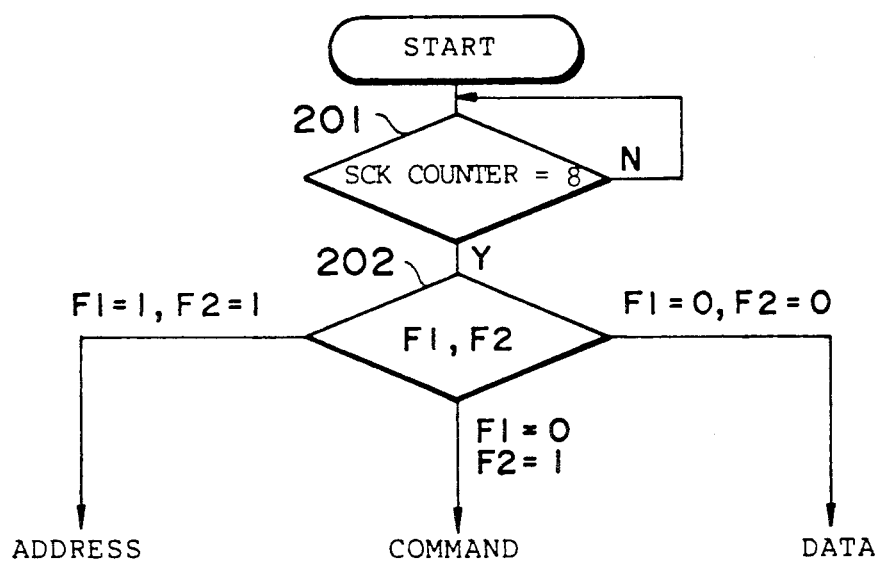
FIG. 7 is a flowchart illustrating processing for determining whether an output signal includes an address, a command or data.

FIG. 7 illustrates processing for identifying the signal $S_o$ by means of the subordinate CPU (and main CPU). When the SCK counter counts up to eight (step 201), the levels of the output signals from flip-flops 103, 104, namely the states of inputs F1, F2, are checked at step 202. If both inputs F1, F2 are at the H level (i.e., F1=1, F2=1), then the signal $S_o$ contains a leading edge and a trailing edge and therefore is construed to include an address. If the input F1 is at the L level and the input F2 is at the H level (i.e., F1=0, F2=1), then the signal $S_o$ contains a trailing edge and therefore is determined to be a command. If both inputs F1, F2 are at the L level (i.e., F1=0, F2=0), then the signal $S_o$ is determined to be data.

It is of course possible for a function the same as that of the interface circuit shown in FIG. 3 to also be implemented by CPU software.

(3) Communication Processing

The processing procedure for communication among the main CPU of system controller 10 and the subordinate CPU's of the imaging controller 30 and recording controller 70 (and playback device 90) will now be described with reference to FIG. 8. The initiative in terms of communication processing is taken by the main CPU.

Figure 8:
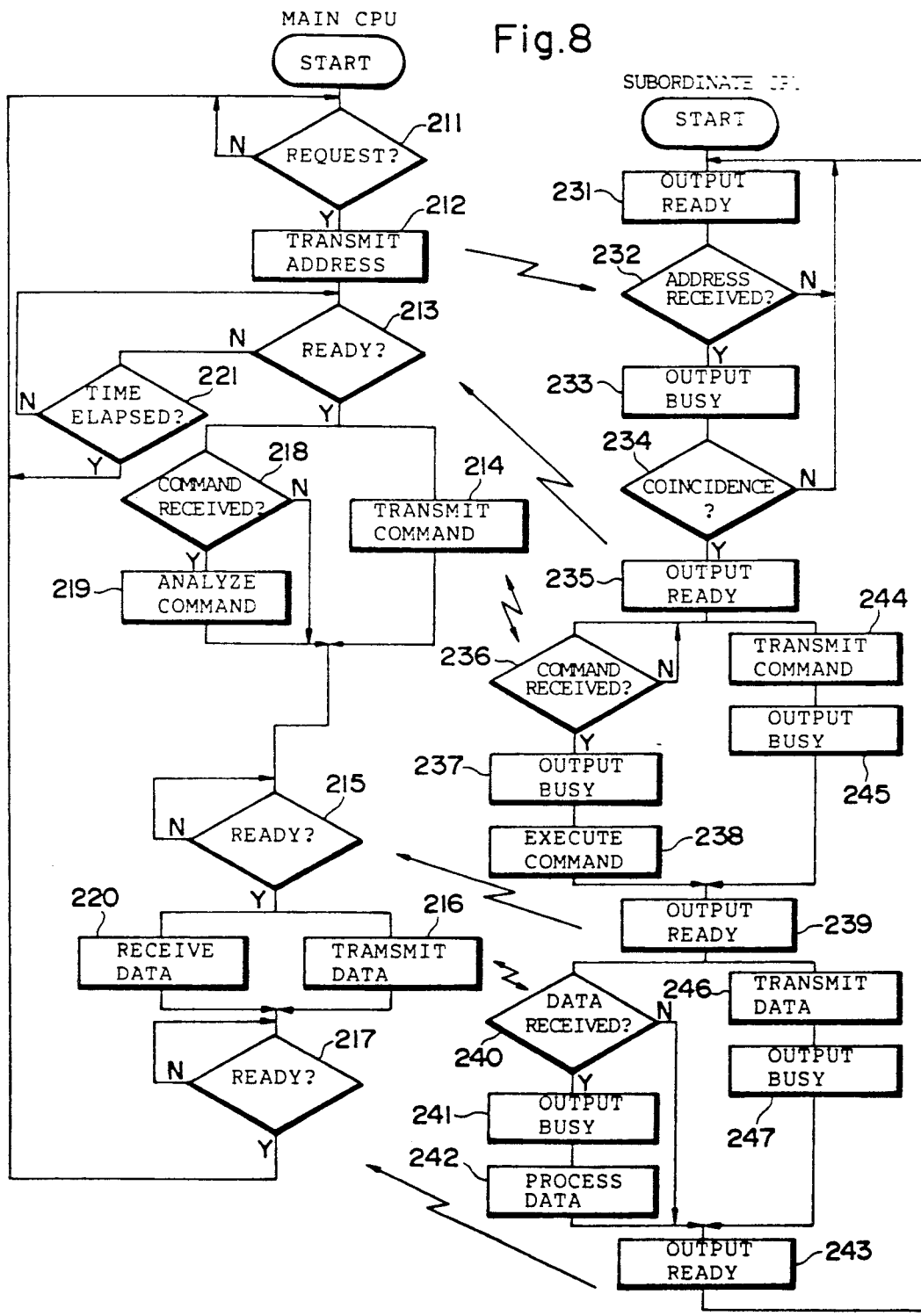
FIG. 8 is a flowchart illustrating processing for communication between a main CPU and a subordinate CPU.

When the timer within the system controller 10 starts its timekeeping operation from the moment the vertical reference signal VD rises and the transition is made to the second half portion of 1V, as described above, the timer applies an interrupt to this effect to the main CPU, as a result of which execution of the communication processing shown in FIG. 8 starts.

First, the main CPU checks to see whether there is a communication request (step 211). There are two types of communication request. One means that a message to be sent to a subordinate CPU is being edited in the FIFO buffer of the main CPU, as set forth above. The other means that the request signal REQUEST is being received from a subordinate CPU (i.e., that the H-level signal is appearing on the request signal line). The latter case signifies a message (command or data) to be sent from the subordinate CPU to the main CPU. The request from the subordinate CPU will be discussed below. Described first will be the case where a command or data is sent from the main CPU to a subordinate CPU.

The main CPU reads out the initial address set in the FIFO buffer and transmits this address as the signal $S_o$ (step 212). The signal $S_o$ is furnished with leading and trailing edges prior to transmission of the address, as set forth earlier.

When the subordinate CPU senses that the transition has been made to the second half portion of 1V (to this end, the subordinate CPU can be provided with a timer or, alternatively, a timer interrupt can be applied by the timer of the main CPU using a specific line), the ready signal READY is raised to the H level (step 231). When the signal $S_o$ ($S_i$) including the address is received (step 323), the subordinate CPU outputs the busy signal $\overline{BUSY}$ (the ready signal READY is sent to the L level) at step 233, and a check is performed to see whether the address in the signal received coincides with its own address (step 234). If the two coincide, the ready signal READY is raised to the H level at step 235 and the program proceeds to the next processing step. If the two do not coincide, this means that the address itself has not been designated, so that the program returns to START.

After transmission of the address signal, the main CPU monitors the ready signal line and checks to determine whether this line is at the H level (step 213). If the ready signal is not transmitted even upon elapse of a fixed period of time following the transmission of the address signal, then it is construed that an error has occurred, the program returns to START and the same address signal is outputted again (step 221).

When the ready signal enters, the main CPU reads the command to be sent next out of the FIFO buffer, incorporates it the signal $S_o$ furnished with the trailing edge and outputs the result (step 214).

When the signal $S_o$ containing the command is received (step 236), the subordinate CPU generates the busy output (step 237) and executes the given command (step 238). The subordinate CPU starts photometry, starts the motor, etc., in the manner described above. When execution of the command ends, the subordinate CPU generates the ready output (step 239).

If there is an item of data to be sent next when the H-level ready signal enters, the main CPU transmits this data as the signal $S_o$ (steps 215, 216) and waits for the ready signal to attain the H level again (step 217).

In a case where there is no data to be sent to the subordinate CPU, as indicated in the example shown in FIG. 6, the processing of steps 216, 217 is skipped and the program returns to START. The next address is then read out of the FIFO buffer and processing for transmitting the address is repeated in the same manner.

In a case where data is sent from the main CPU to the subordinate CPU, the subordinate CPU receives this data (step 240), whereupon it generates the busy output (step 241) and executes processing with regard to the data received (step 242). When this data processing ends, the ready signal is outputted and the program returns to START (step 243). If no data is received, the processing of steps 240 through 243 is skipped.

Figure 9:
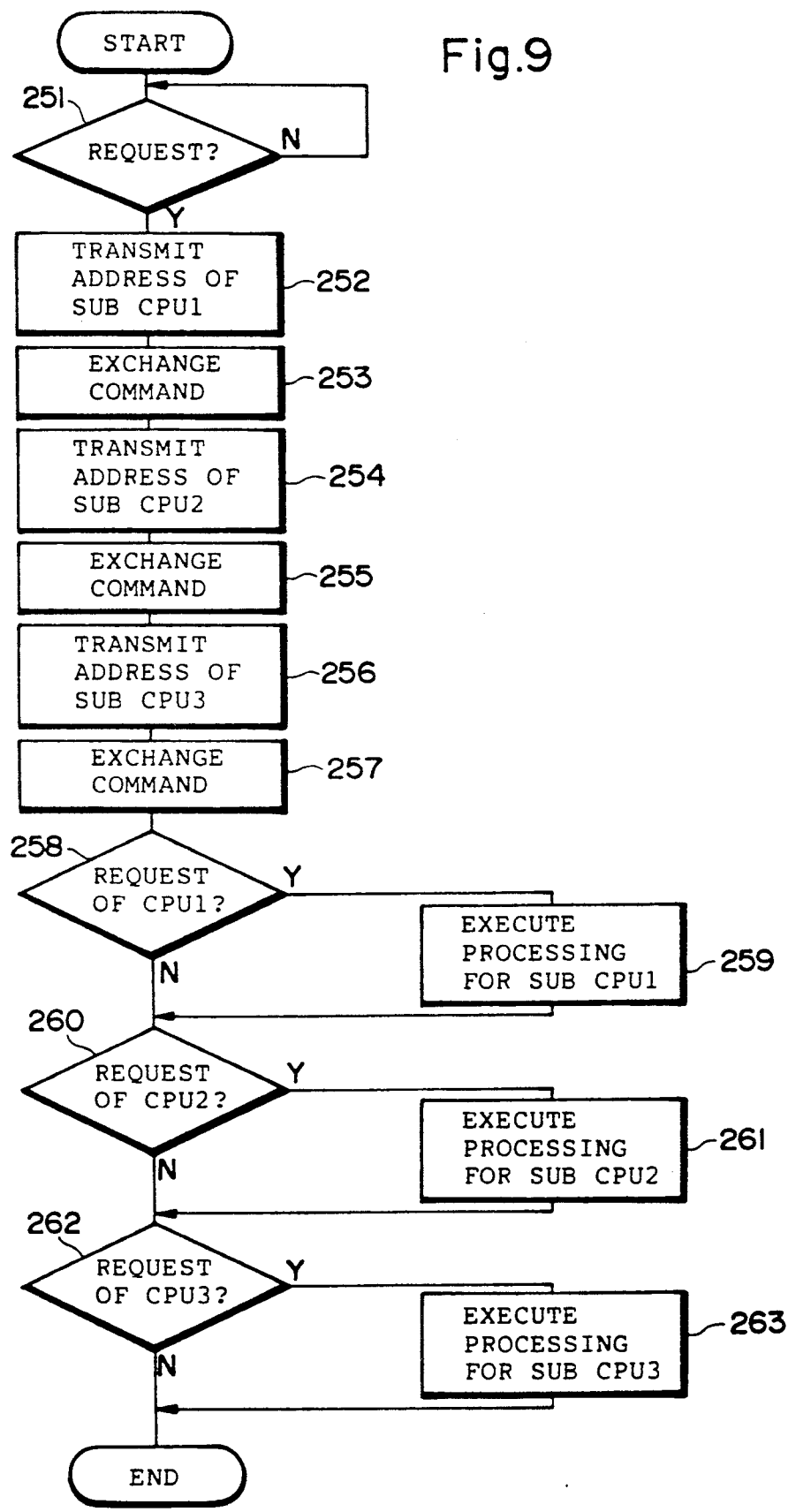
FIG. 9 is a flowchart illustrating processing executed by the main CPU when a request is received from the subordinate CPU.

If a command or data is sent from the subordinate CPU to the main CPU, the subordinate CPU outputs the H-level request signal REQUEST. However, since the request signal lines of the controllers 30, 70 and playback device 90 (as well as other signal lines) are connected to the same lines of the system controller 10 by wired OR's, the main CPU is incapable of comprehending which of the subordinate CPU's has sent the request signal. Accordingly, the main CPU performs communication processing for confirming, with respect to all of the subordinate CPU's, whether a request signal has been outputted and what kind of request has been made. FIG. 9 illustrates the general features of the communication processing procedure executed by the main CPU based on the request signal from the subordinate CPU.

The series of processing steps shown in FIG. 9 is actually executed by repeating the communication processing of FIG. 8 a number of times equivalent to the number of subordinate CPU's. The processing of FIG. 9 will now be described in relation to the processing of FIG. 8. The subordinate CPU's of the imaging controller 30, recording controller 70 and playback device 90 shall be referred to as subordinate CPU 1, subordinate CPU 2 and subordinate CPU 3, respectively.

The main CPU determines whether an H-level signal is appearing on the request signal line (step 251, which corresponds to step 211 of FIG. 8). If a request signal is arriving, it is necessary to determine which of the subordinate CPU's has issued the request. In order to accomplish this, the main CPU first outputs the signal $S_o$ which includes the address of the subordinate CPU 1 (step 252, which corresponds to step 212 of FIG. 8). Since the subordinate CPU 1 generates the ready signal (steps 235, 213 in FIG. 8), the main CPU transmits an all-zero command (step 214 in FIG. 8). At the same time, the subordinate CPU 1 sends a command to the main CPU since this command is to be transmitted to the main CPU when the request signal is outputted (steps 244, 245 in FIG. 8). Since the line for the output signal $S_o$ and the line for the input signal $S_i$ are provided between the main CPU and the subordinate CPU's, two-way simultaneous communication is possible. When the subordinate CPU 1 is not outputting a request signal, it responds to the all-zero command from the main CPU by transmitting a command to this effect to the main CPU. Upon receiving the command from the subordinate CPU 1, the main CPU analyzes the contents of the command and stores the results in memory (steps 218, 219 of FIG. 8). Thus, an exchange of commands is performed between the subordinate CPU 1 and the main CPU (step 253), the main CPU determines whether the subordinate CPU 1 has issued a request and, if the request has been issued, determines what is being requested. It is permissible to adopt an arrangement in which the subordinate CPU 1 does not respond to the all-zero command from the main CPU if the subordinate CPU 1 is not issuing a request. If no response is received from the subordinate CPU 1 upon elapse of a fixed period of time from transmission of the all-zero command, this is construed as meaning that the subordinate CPU 1 is not issuing a request.

If the subordinate CPU 1 is not issuing a request, this means that another subordinate CPU has issued the request. Accordingly, the main CPU transmits the signal $S_o$ which includes the address of subordinate CPU 2 or subordinate CPU 3 and executes the same processing as that described above (steps 254-257). Since it is possible that two or more subordinate CPU's will output requests substantially simultaneously, an arrangement may be adopted in which the main CPU proceeds to the processing of steps 254-257 even when it has determined that the subordinate CPU 1 has issued a request.

When a subordinate CPU which has issued a request is thus identified and the contents of the request understood, the program proceeds to processing for dealing with the request. If the subordinate CPU 1 has issued the request, processing in accordance therewith is executed (steps 258, 259). If another subordinate CPU has issued the request, processing in accordance therewith is executed (steps 260, 261 for subordinate CPU 2, and steps 262, 263 for subordinate CPU 3). For example, if there were a request for a subordinate CPU to send data to the main CPU, processing would be executed in which the subordinate CPU sends the data (steps 246, 247 in FIG. 8) and the main CPU receives the data (step 220 in FIG. 8). It can also be arranged so that when the subordinate CPU 1 issues a request, the program proceeds directly from step 253 to step 259. If the request relates to data transmission in such case, the program would proceed directly to processing for a data exchange (steps 216, 240-242 or steps 246, 247, 220) after the command exchange processing of FIG. 8 (steps 214, 218, 219, 244, 245).

In the illustrated embodiment, communication between the playback device 90 and the system controller 10 is performed only if the playback device 90 issues a request signal. In FIG. 1, the serial transmission line, a playback still video signal output line and a line for the phase pulse PG connected to the playback device 90 are actually bundled together to form a single cable. Whereas the playback still video signal is on the order of several hundred millivolts, the signals on the serial transmission line are 5 V signals, by way of example. Accordingly, when serial communication is performed while the playback still video signal is being transmitted, there is the danger that noise may be produced in the playback still video signal. A key switch input on the side of the playback device 90 is an example of a case in which a request signal is outputted from the playback device 90 to the system controller 10 to send information to the latter. For example, the key switches include a fast-forward switch, a reverse switch and a track-number designating switch. Since communication between the playback device 90 and the system controller 10 is performed only in these limited cases, noise will not develop in the playback video signal at all times. This solves the problem of a deterioration in the picture quality of a played back still picture.

Figure 10:
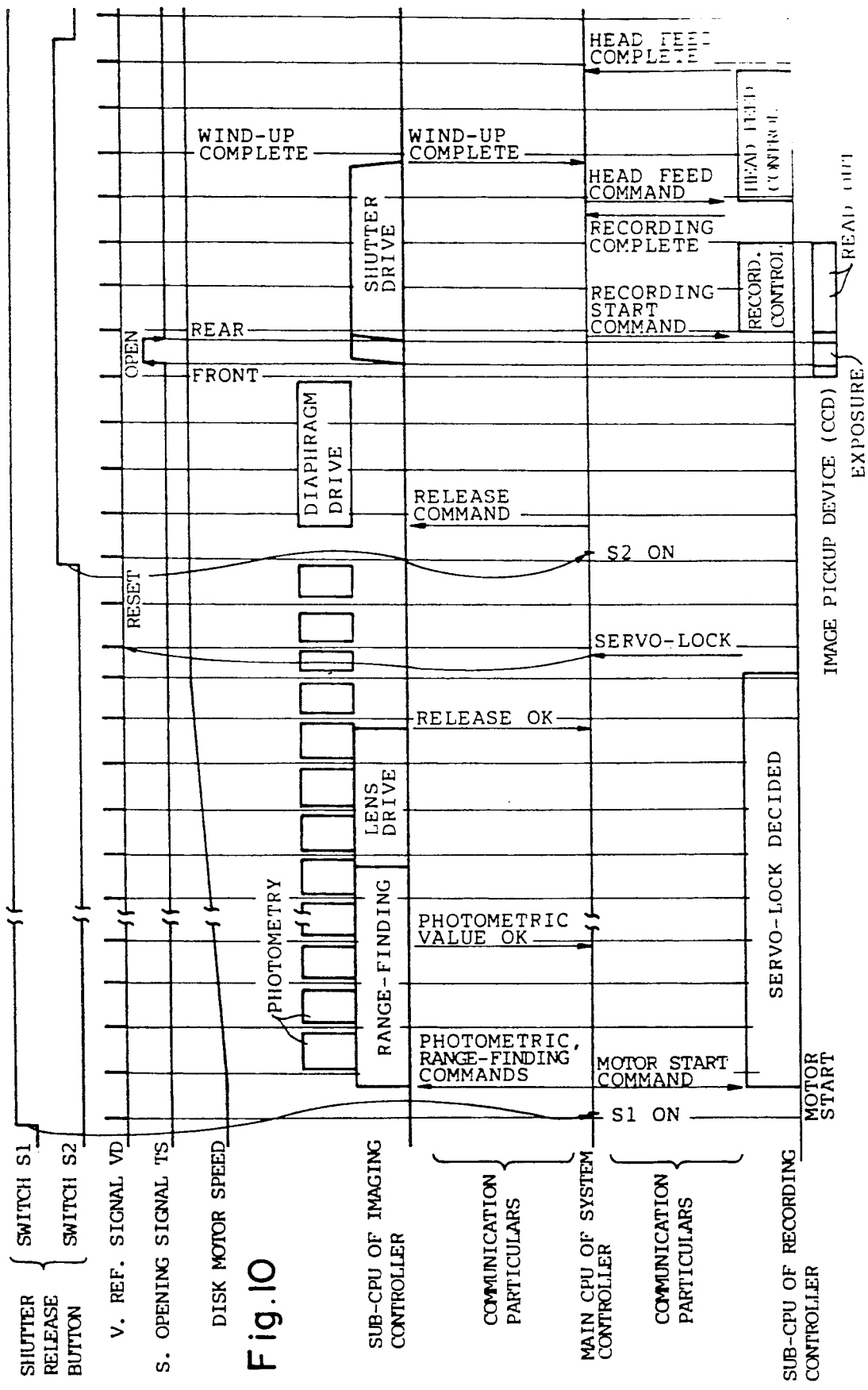
FIG. 10 is a time chart illustrating overall operation of the still video camera during photography.

Lastly, the overall operation of the still video camera at the time of photography and recording will be described with reference to FIG. 10, with particular emphasis being placed upon communication between the main CPU of system controller 10 and the subordinate CPU's of the imaging controller 30 and recording controller 70. Processing for loading/unloading the magnetic head 2, white balance adjustment and the like are deleted from FIG. 10.

When the first switch S1 of the shutter-release button 15 is pressed, this is sensed by the main CPU of the system controller 10, whereupon the subordinate CPU 1 of the imaging controller 30 is provided with photometry and rangingfinding commands and the subordinate CPU 2 of the recording controller 70 with a motor start command. As a result, the imaging controller 30 starts photometric and rangefinding processing. Photometric processing is executed every 1V in synchronization with the vertical reference signal VD. If the photometric value lies within a range that enables photography, a message to the effect that the photometric value is acceptable is sent from the subordinate CPU 1 to the main CPU. Focusing control of the imaging lens system 32 is performed based on the rangefinding data. If focusing is performed correctly, a message to the effect that the shutter release is allowable is sent from the subordinate CPU 1 to the main CPU. Since the recording controller 70 starts the disk motor 3, the rotational speed of the motor 3 rises. The controller 70 performs servo-lock decision processing, in which it is determined whether the rpm of the motor 3 has attained a predetermined value.

If it is determined that the disk motor 3 has attained the servo-locked state, the subordinate CPU 2 of the recording controller 70 so informs the main CPU of the system controller 10. Further, the subordinate CPU 2 of the recording controller 70 outputs a reset signal to the signal processing circuit 71, and the vertical reference signal VD is controlled so as to exhibit the above-described phase relationship with regard to the phase pulses PG. Even after this the recording controller 70 executes servo-lock processing and phase relationship decision processing for VD and PG whenever the vertical reference signal VD is generated (in the first half of 1V), in the manner described above, and the main CPU is informed of the results.

Upon sensing that the second switch S2 of the shutter release button 15 has been pressed, the main CPU determines whether imaging conditions are satisfied based on the results of the servo-lock decision and the results of the phase relationship decision communicated by the recording controller 70, as well as on the basis of other information, and applies a release command (photography start command) to the subordinate CPU 1 of the imaging controller 30 if the conditions are satisfied. In response, the subordinate CPU 1 of the imaging controller 30 decides the diaphragm value and shutter speed based on the final photometric value and controls drive of the diaphragm in such a manner that the diaphragm value decided is attained. The controller 30 begins imaging processing at the moment the preparations therefor have been made. If the main CPU decides that the imaging conditions are not satisfied during this processing, it applies a photography-inhibit command to the imaging controller 30.

Image processing in the imaging controller 30 is started by the subordinate CPU 1 of imaging controller 30 generating a shutter opening signal TS whose pulse width corresponds to the shutter speed decided. The shutter 36 is driven in such a manner that its front curtain travels at the instant the signal TS rises and its rear curtain travels at the instant the signal TS decays, thereby exposing the image pick-up device 37 to light. Thereafter, the shutter wind-up operation is performed.

The shutter opening signal TS enters the system controller 10 through a line not shown in FIG. 1. Upon detecting the trailing edge of the signal TS, the main CPU applies a recording start command to the recording controller 70. Over the interval of 1V or 2V which starts from the next signal VD, processing for recording the detected still video signal from the image pick-up device 37 on the video floppy 1 following frequency modulation is performed by the controller 70. What is shown in FIG. 10 is an example of frame recording. Therefore, reading and writing of first and second fields of a video signal are performed over an interval of 2V.

When recording processing ends, the subordinate CPU 2 of the controller 70 informs the main CPU of the fact that recording has been completed. Thereafter, the main CPU applies a head feed command to the subordinate CPU 2, whereby the magnetic head 2 is transferred, under the control of the subordinate CPU 2, to the track to be recorded on next. When the transfer of the magnetic head 2 to this track ends, the subordinate CPU 2 so informs the main CPU. When wind-up of the shutter is completed, the subordinate CPU 1 in imaging controller 30 so informs the main CPU.

(4) Measures for Instantaneous Shutdown

Figure 11:
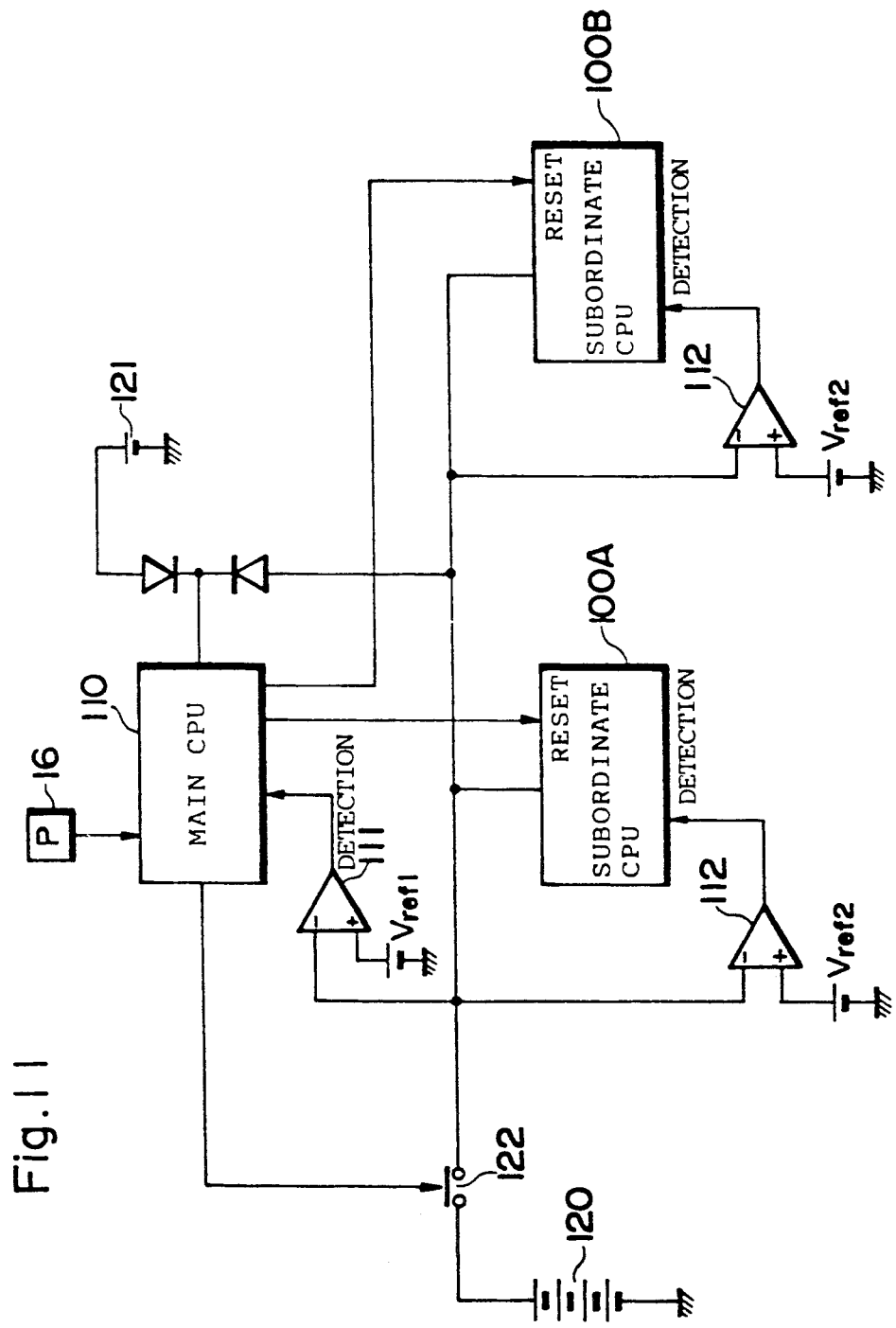
FIG. 11 is a block diagram showing, in extracted form, a circuit for dealing with instantaneous shutdown.

FIG. 11 illustrates, in extracted form, a main CPU 110 of the system controller 10, a subordinate CPU 100A (subordinate CPU 1) of the imaging controller 30 and a subordinate CPU 100B (subordinate CPU 2 ) of the recording controller 70. These CPU's 110, 100A and 100B are supplied with operating power by a main power supply (main battery) 120 via a main power supply control switch 122. The main CPU 110 is backed up by an auxiliary power supply 121. When the switch 122 is opened, the main CPU 110 is backed up by the auxiliary power supply 121 and assumes a standby state. When the power supply switch 16 is pressed to apply a switch input in this state, the main CPU 110 is started, whereby the switch 122 is closed. In response, main power is supplied not only to the main CPU 110 but also to the subordinate CPU's 100A, 100B. If there is an input produced by the power supply switch 16 when the switch 122 is closed, the main CPU 110 opens the switch 122 and returns to the standby state.

The operating power from the main power supply 120 is supplied not only to the CPU's but also to all circuits and devices shown in FIG. 1. For example, when an excessively large current flows into the various motors for some reason or other or if the contacts of the terminals at the location where the main power supply 120 is accommodated separate slightly due to vibration or the like, the voltage of the main power supplied to the CPU's 110, 100A, 100B will drop temporarily. This is the instantaneous shutdown phenomenon.

In order to cope with this phenomenon, the main CPU 110 is equipped with a power supply voltage-drop detector circuit 111 and each of the subordinate CPU's 100A, 100B is provided with a power supply voltage-drop detector circuit 112. These detector circuits 111, 112 are comparators for comparing the main power supply voltage with reference voltages $V_{ref1}$, $V_{ref2}$ (which are lower than ordinary power supply voltage), respectively, and each is adapted to output a detection signal when the main power supply voltage drops below the respective reference voltage. The detection signal is applied to the corresponding CPU which, when the signal enters, is placed in the standby state. The reference voltages $V_{ref1}$, $V_{ref2}$ are generated by a stable power supply or stable power supply circuit.

The reference voltage $V_{ref1}$ of the detector circuit 111 of main CPU 110 is set to a value lower than the reference voltage $V_{ref2}$ of the detector circuit 112 of the subordinate CPU's 100A, 100B. That is, $V_{ref1} < V_{ref2}$. Accordingly, the detector circuit 112 of the subordinate CPU's is more sensitive to instantaneous shutdown than the detector circuit 111 of the main CPU. In other words, there will be cases where instantaneous shutdown not detected by the detector circuit 111 can be detected by the detector circuits 112.

A reset line is provided from the main CPU 110 to the subordinate CPU's 100A, 100B. This is used in order that the main CPU 110 may start the subordinate CPU's 100A, 100B that are in the standby state.

Consider a situation in which instantaneous shutdown occurs when each CPU is performing a predetermined operation with the main power supply switch 122 closed, and this is detected by detector circuits 112 but not by the detector circuit 111. In such case, the subordinate CPU's 100A, 100B assume the standby state and the main CPU 110 is executing its predetermined operation. At this time the main CPU 110 outputs a reset signal to the subordinate CPU's 100A, 100B to start these CPU's.

Figure 12:
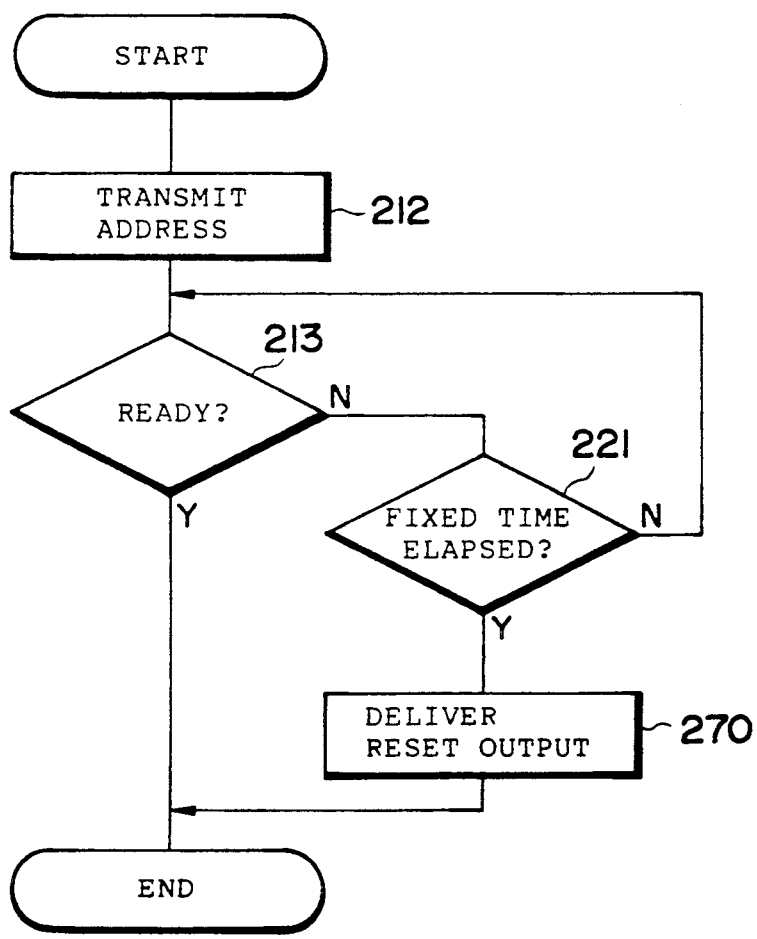
FIG. 12 is a flowchart illustrating a processing procedure in which the main CU resets a subordinate CPU.

The procedure for this processing is illustrated in the flowchart of FIG. 12. The processing is executed in association with the communication processing described earlier with reference to FIG. 8. Steps in FIG. 12 which represent processing similar to that shown in FIG. 8 are designated by like reference numerals. The main CPU 110 outputs an address signal to either of the subordinate CPU's via the serial transmission line (step 212). If a ready signal returns from the subordinate CPU, the condition is decided to be normal (step 213. However, if the ready signal line does not attain the H level even upon elapse of a fixed time period (step 221), the main CPU 110 outputs the reset signal to the subordinate CPU of the particular address to start this subordinate CPU (step 270). It goes without saying that this processing is performed with respect to both of the subordinate CPU's 100A, 100B.

An arrangement can be adopted in which the detection signals from the detector circuits 112 are applied to the main CPU 110 in order that the main CPU 110 may be capable of knowing that the subordinate CPU's 100A, 100B have assumed the standby state.

When all of the detector circuits 111, 112 detect instantaneous shutdown and the main CPU 110 and subordinate CPU's 100A, 100B assume the standby state, restoration is performed in the following manner: The main CPU 110 is backed up by the auxiliary power supply 121. Therefore, when the power supply switch 16 is pressed (twice if necessary), this is detected and the main CPU 110 is started, as described above. The started main CPU 110 starts the subordinate CPU's by the aforementioned procedure shown in FIG. 12.

In the foregoing example, the two subordinate CPU's 100A, 100B are provided with the respective detector circuits 112, the reference voltages whereof are set to the same value, namely $V_{ref2}$. It possible to adopt an arrangement in which a single detector circuit is provided for the two subordinate CPU's, with the detection signal from this detector circuit being applied to both subordinate CPU's. Where the two detector circuits 112 are provided, it is permissible to adopt different reference voltage values for these circuits.

It goes without saying that it can be arranged for the same type of instantaneous shutdown countermeasures to be carried out for the subordinate CPU of the playback device 90.

As many apparently widely different embodiments of the present invention can be made without departing from the spirit and scope thereof, it is to be understood that the invention is not limited to the specific embodiments thereof except as defined in the appended claims.

What is claimed is:

1. A recording/playback apparatus which performs at least recording of a prescribed signal on a rotating recording medium, or playback of a signal from the rotating recording medium, in synchronization with a rotational reference phase of the rotating recording medium, comprising:
   a plurality of controllers for sharably controlling a plurality of portions of the recording/playback apparatus or the entirety thereof by executing communication processing with one another; and
   control means for controlling said communication processing in such a manner that said processing is performed only in a second half of one period of a signal related to the rotational reference phase of the rotating recording medium.

2. The apparatus according to claim 1, wherein one of said plurality of controllers comprises a main controller provided with said control means and the others are subordinate controllers controlled by said main controller.

3. The apparatus according to claim 2 wherein said main controller comprises a system controller and wherein said subordinate controllers comprise an imaging controller and a recording controller.

4. The apparatus according to claim 2 wherein said controllers are comprised of a plurality of CPUs.

5. The apparatus according to claim 4 wherein said plurality of CPUs include a main CPU and at least one subordinate CPU.

6. The apparatus according to claim 5 wherein said subordinate CPU is connected to said main CPU, and
   wherein each of said CPUs further include a respective detector circuit for detecting a drop in a main power supply voltage below a predetermined respective threshold level and for causing each said CPU to assume a standby state when said main power supply voltage drops below said predetermined respective threshold level.

7. The apparatus according to claim 6 wherein said detector circuit of said main CPU further has a threshold level lower than the threshold level of the detector circuit of said subordinate CPU.

8. The apparatus according to claim 7 wherein said main CPU is additionally supplied with auxiliary power from a power source, said main CPU further having means responsive to said auxiliary power for starting the subordinate CPU following a standby state.

9. A method of communicating in a recording/playback apparatus which performs at least recording of a prescribed signal on a rotating recording medium, or playback of a signal from the rotating recording medium, in synchronization with a rotational reference phase of the rotating recording medium, said method comprising the steps of:
   executing control of the recording/playback apparatus by allowing a plurality of controllers to communicate with one another, said controllers sharing control of various portions of the recording/playback apparatus or the entirety thereof;
   forming messages, arraying the messages in a transmission sequence and storing them in a buffer, all in a first half of one period of a signal associated with the rotational reference phase of the rotating recording medium; and
   performing communication, between said controllers, which includes transmission of the messages formed, only in a second half of said one period.

* * * * *